Sept. 27, 1955   C. C. FUERST ET AL   2,718,834
SHUTTER WITH AUTOMATIC AND SETTING RELEASING MECHANISMS
Filed Jan. 13, 1954   4 Sheets-Sheet 1
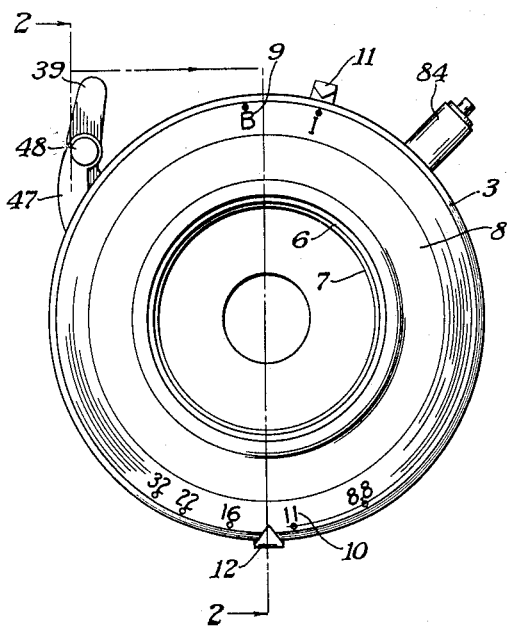
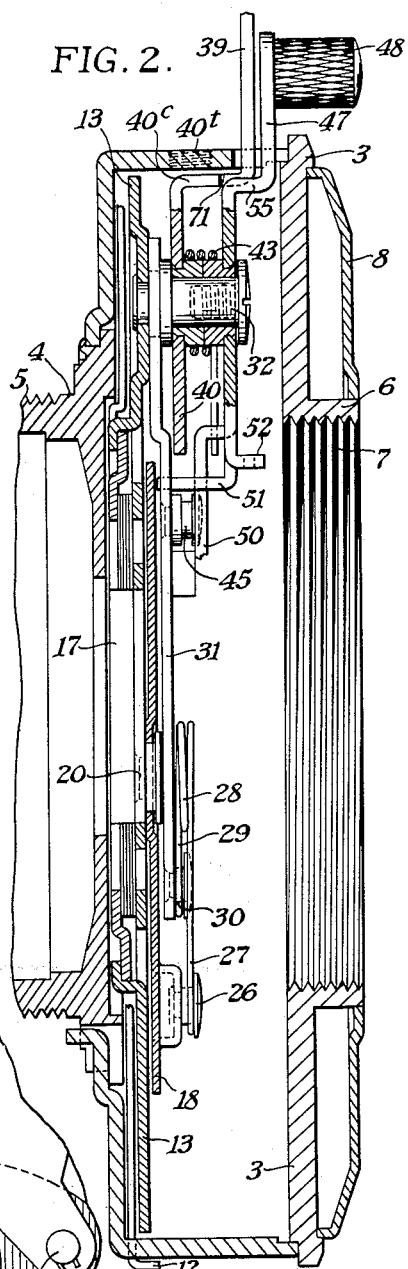
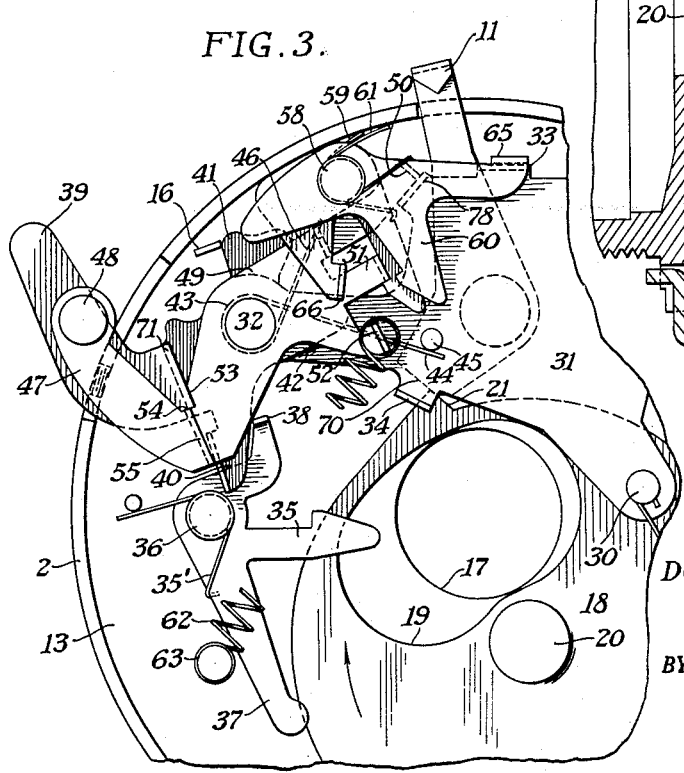
CARL C. FUERST
DOUGLASS C. HARVEY
INVENTORS
BY
ATTORNEYS

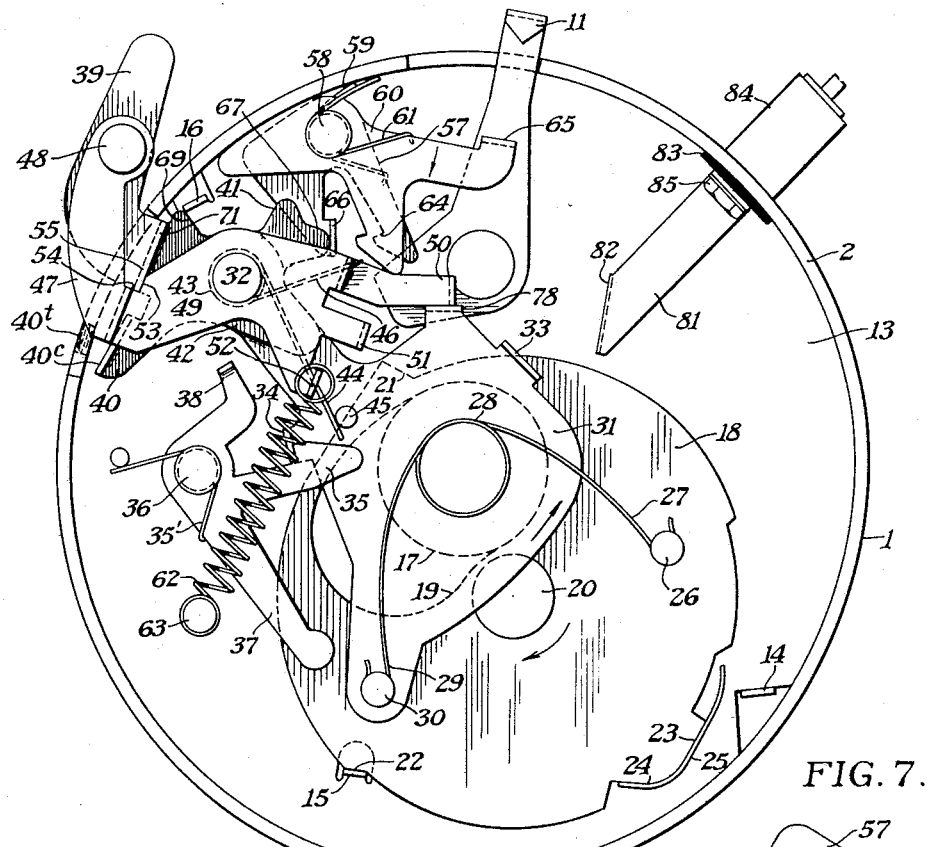
FIG. 4.
FIG. 5.
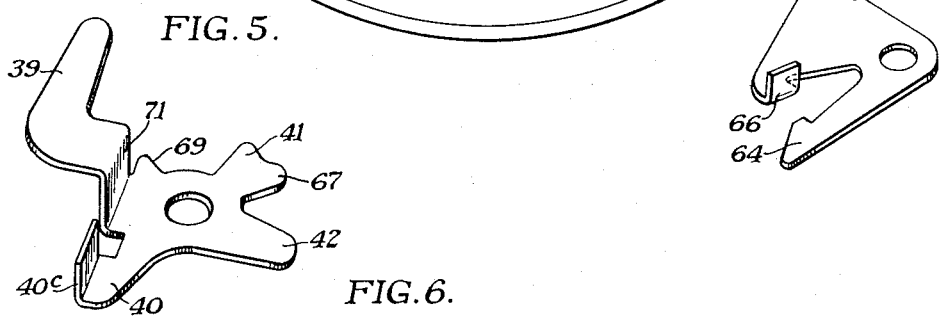
FIG. 7.
FIG. 6.
CARL C. FUERST
DOUGLASS C. HARVEY
INVENTORS
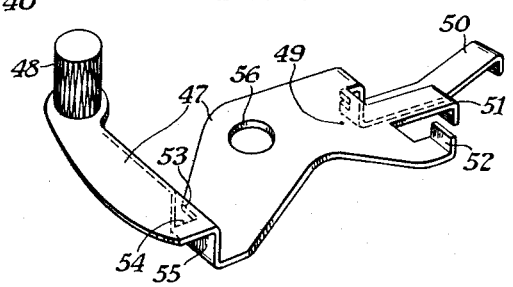
ATTORNEYS

CARL C. FUERST
DOUGLASS C. HARVEY
INVENTORS

BY

ATTORNEYS

CARL C. FUERST
DOUGLASS C. HARVEY
INVENTORS

ATTORNEYS

United States Patent Office 2,718,834
Patented Sept. 27, 1955

2,718,834

SHUTTER WITH AUTOMATIC AND SETTING RELEASING MECHANISMS

Carl C. Fuerst and Douglass C. Harvey, Rochester, N. Y., assignors to Eastman Kodak Company, Rochester, N. Y., a corporation of New Jersey Application January 13, 1954, Serial No. 403,802

8 Claims. (Cl. 95—60)

This application relates to photography and more particularly to inexpensive shutters for cameras. One object of our invention is to provide a reliable and inexpensive shutter in which the speed of exposure will remain constant. Another object of our invention is to provide a shutter which can be operated either as an automatic shutter or as a setting shutter. Another object of our invention is to provide a means for materially reducing shake or vibration of the shutter as an exposure is being made. A still further object of our invention is to provide a shutter which can be made of relatively inexpensive parts and in which the number of parts is reduced to a minimum. Other objects will appear from the following specification, the novel features being particularly pointed out in the claims at the end thereof.

In the past, most photographic shutters have been of two general types—a setting shutter in which a separate lever is employed to tension a driving spring, and an automatic shutter in which the main spring must be tensioned and released through movement of a shutter trigger. Many camera operators can operate a setting shutter by applying only light pressure to the trigger so that there is very little possibility of shaking the camera while an exposure is being made. On the other hand, the majority of operators using an automatic type shutter tend to press the trigger more firmly than is required and, consequently, when the trigger releases the power spring, there is a tendency to shake the shutter just at the time an exposure is being made, thereby reducing the sharpness and clarity thereof. Unfortunately the automatic shutters are almost always the least expensive shutters, and are used by the majority of operators and, consequently, it is desirable to provide a means for overcoming this difficulty. It is especially noted that there are also camera operators who apparently never seem to shake a shutter whether it is an automatic shutter or not, and these operators generally prefer the automatic type of shutter as being less nuisance to operate.

We have particularly directed this invention to overcome the above known defects by providing a shutter which may be used as a setting shutter when desired and which may also be used as an automatic shutter by those who prefer this mode of operation.

Coming now to the drawings wherein like reference characters denote like parts throughout Fig. 1 is a front plan view of the exterior of a camera shutter constructed in accordance with and embodying a preferred form of my invention;

Fig. 2 is an enlarged fragmentary section taken through the shutter shown in Fig. 1 and showing certain parts of the shutter in elevation. This section is taken on line 2—2 of Fig. 1;

Fig. 3 is a fragmentary top plan view showing a portion of the shutter mechanism employed in our improved shutter;

Fig. 4 is a top plan view of our shutter mechanism with the parts in a normal rest position in which the shutter is ready for an exposure;

Fig. 5 is a perspective view of the shutter trigger removed from the shutter;

Fig. 6 is a perspective view of the shutter-setting lever removed from the shutter;

Fig. 7 is a perspective view of a lower latch member used in our improved shutter;

Figure 8:
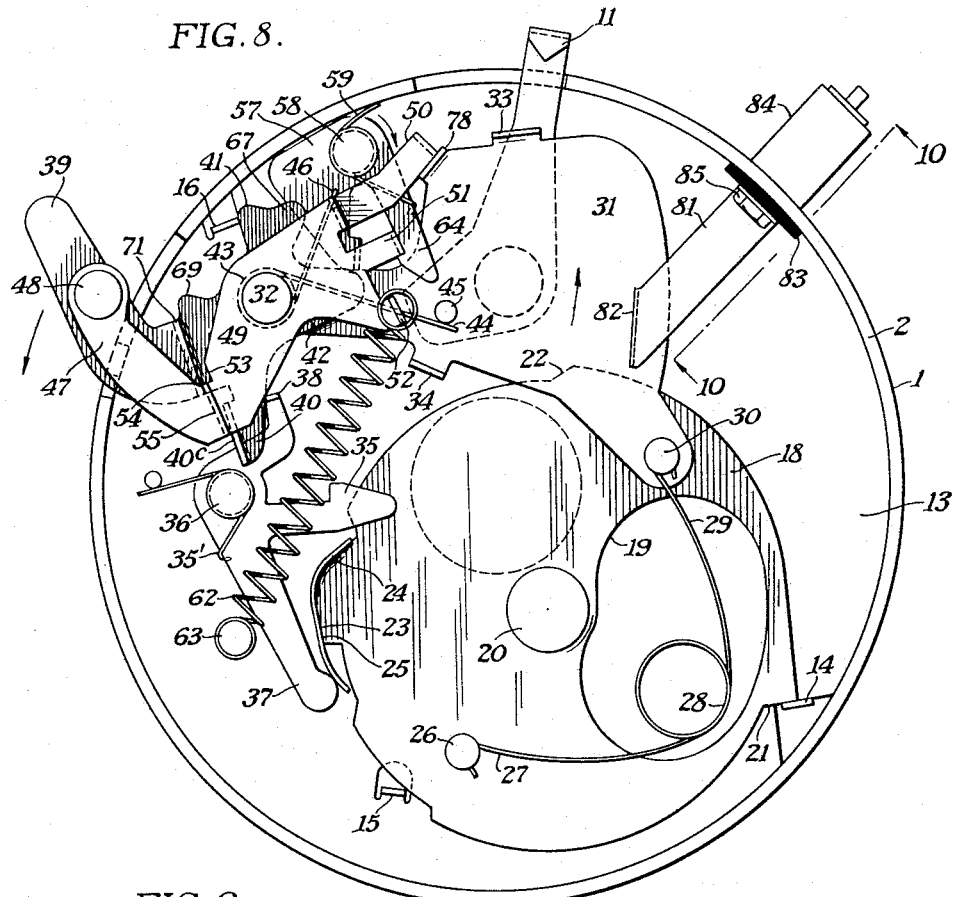
Fig. 8 is a view similar to Fig. 4 showing the parts in the position they assume at the completion of an exposure, certain parts being omitted to better illustrate the invention.

Our improved shutter consists broadly in a shutter mechanism having a trigger which may be operated in the usual automatic shutter manner by depressing the trigger to tension and releasing the operating spring to make an exposure. The shutter is provided with a means for setting the shutter so that, if desired, only very light pressure on the trigger may be applied to release the shutter after having tensioned the shutter spring to make an exposure. This shutter is an improvement over the shutter shown in Patent 2,443,164, Harvey, Blade and Cover Blind Shutter for Cameras, granted June 8, 1948, and in our application Serial No. 280,038, filed April 2, 1952, now abandoned, of which this application is a continuation-in-part.

The shutter differs from that of Patent 2,443,164 in that while it utilizes the same kind of light-weight hairpin spring for operating the shutter blade as shown in the patent, it utilizes in addition a spring which may overcome this light-weight spring to restore the mechanism to its initial position of rest after an exposure is made. This makes possible a means for setting the shutter for those who wish such a shutter without preventing the automatic shutter actuation without setting for those who prefer automatic actuation.

As indicated in Figs. 1 and 2, the shutter may consist of a shutter support here in the form of a casing designated broadly as 1 having an upstanding flange 2 on which a front plate 3 is mounted. The shutter casing 1 includes a rearwardly-extending tube 4 threaded at 5 and the front plate 3 includes a forwardly-extending tube 6 threaded at 7. A single or multiple lens objective may be supported by threads 5 and/or 7. A decorative plate 8 may be applied on the front of the shutter and this plate may bear the exposure-indicating marks 9, indicating the type of the exposure, diaphragm-indicating marks 10. A pointer 11 is adjustable over the time scale 9 and a pointer 12 is adjustable over the diaphragm scale 10.

The shutter preferably contains a mechanism plate 13 suitably mounted near the bottom of the shutter casing 1. This mechanism plate is provided with a formed-up stop lug 14 for shutter blade 18 and a second formed-up shutter stop lug 15, these two lugs defining the maximum rotation of the shutter in two directions. There is also a trigger stop lug 16 formed in the mechanism plate, all as will be hereinafter more fully described. The shutter blade 18 may be of the simple disk type having an exposure slot 19 of the desired length therein, this slot being adapted to cover and uncover the exposure aperture 17 in the mechanism plate 13. The shutter blade is pivoted upon a stud 20 and it is provided with a pair of stop surfaces one surface 21 adapted to strike the stop lug 14, and the other surface 22 adapted to stop against stop lug 15 as shown in Fig. 4. The shutter is also provided with an upwardly-formed rebound flange 23. This flange has an inclined end 24 at one end, and the medial section 25 tapers inwardly from a position tangent to the periphery of the shutter. This rebound flange 23 is adapted to strike a lever arm 37, as shown in Fig. 8 and as will be hereinafter described. The shutter includes a stud 26 about which one end 27 of a hairpin spring 28 is attached, the opposite end 29 of this spring encircling a stud 30 on a cover blind 31. Hairpin spring 28 may be referred to as the first spring. The cover blind is pivoted to turn on a stud 32 carried by the mechanism plate.

Figure 9:
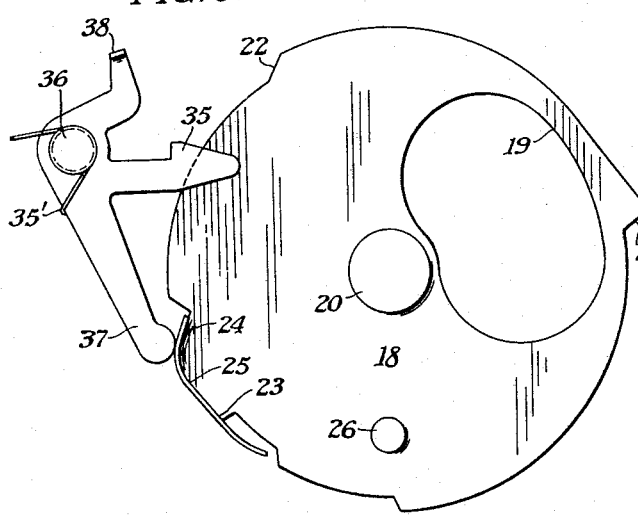
Fig. 9 is a fragmentary detail view showing the shutter trip latch and its rebound-preventing position.

The cover blind's function is to cover the exposure aperture 17 except when an exposure is being made and to tension and release the hairpin, or first spring 28 so that the shutter blade will move through the necessary angle to make an exposure. When the cover blind 31 is to be moved in a counterclockwise direction from its Fig. 4 position, stud 30 will swing between stud 32 and stud 26, thereby tensioning and releasing the first, or hairpin, spring 28 to move the shutter blade 18 in a clockwise direction. The cover blind 31 includes an upwardly-turned flange 33 on one side and a similar flange 34 on the opposite side, this latter flange 34 constituting a first latch element to be engaged and to be held by a second latch element 35 pivotally mounted on a stud 36. The second latch element 35 consists of the arm carrying the latch element and additional arms 37 and 38. The former arm 37 is a rebound controlling arm and, as shown in Fig. 4, when the parts are at rest it merely lies idly in the position shown. However, when the shutter blade 18 swings in the direction shown by the arrow, Fig. 1 the rebound control flange 23 swings around until the arm 37 rides up the incline 24, Fig. 9, and then gradually down the intermediate area 25, Fig. 8, so that the momentum of the shutter is taken up and so that the stop 21 in reaching lug 14 has been slowed up to such an extent that rebound does not take place. The second latch element 35 and its rebound arm 37 are held in the position shown by a spring 35' so that, of course, the arm 37 tends to turn this spring slightly as it engages the rebound flange 25.

The upwardly-turned lug 38 of the second latch element 35 lies in the path of a shutter trigger 39, this trigger being preferably pivoted upon the stud 32 and preferably having a flanged arm 40, a latch-engaging arm 41 and a second latch-engaging arm 42. When the trigger 39 is turned about the stud 32 in a counter-clockwise direction, the flanged arm 40 swings around, as indicated in Fig. 8, engaging arm 38 of the blade release, or second latch 35, turning this latch until the cover blind, or first latch element 34 is released. When so released, the cover blind will be driven in the counterclockwise direction as shown by the arrow in Fig. 4 by means of the second spring 43 encircling the stud 32, one end of which 44 engages the upstanding pin 45 on the cover blind. The other end of the second spring 43 engages an arm 50 of a setting lever 47 which, in this instance, is pivoted on the stud 32. Trigger movement is limited by stop 16, Fig. 8, which may strike either surface 69 or 41 of the trigger.

The second spring 43 is under tension when an exposure is to be made whether it is placed under tension by movement of the trigger 39 alone or whether it is separately placed under tension by the setting lever 47. Consequently, when the first latch element 34 and the second latch element 35 are released, the cover blind 31 swings counterclockwise, opening the exposure aperture 17, and the shutter blade 18 will then swing in a clockwise direction when the first spring, the hairpin spring 28, is tensioned and released, causing the aperture 19 in the shutter blade 18 to swing over and then close the exposure aperture 17. When the shutter is to be used as a setting shutter, a handle 48 which projects forwardly from the setting lever 47 and a trigger 39, as best shown in Fig. 2, is moved in a counterclockwise direction.

The setting lever 47 is best shown in Fig. 6. It includes a body portion 49 from which three arms extend outwardly; arm 50, which includes a downwardly-turned lug, arm 51, which also includes a downwardly-turned lug, and arm 52, which includes an upwardly-turned lug. The setting lever also includes a shoulder 53 on one side of a notch 54 and an offset forming 55. There is an aperture 56 of such a size that the setting lever may turn freely on the stud 32.

This setting lever 47, if set by the handle 48, is moved until the flanged arm 51 is caught by an upper or third latch element 60 pivoted at 58 to the mechanism plate 13 and normally turned in a clockwise direction by a third spring 61. This is shown in Fig. 4 in which view a lower or fourth latch 57 is also shown. The lower or fourth latch 57 is pivoted on stud 58 and is also turned in a clockwise direction by a fifth spring 59 and is adapted to also turn upon the stud 58. When the setting member 48 is moved to the Fig. 11 position in setting, it may be engaged by the upper, or third latch element 60 which holds a return spring, the fourth spring 62 in a tensioned position. This spring engages the formed-up lug 52 on the setting lever 49 at one end, and encircles a pin 63 at the other end carried by the mechanism plate 13.

Figure 11:
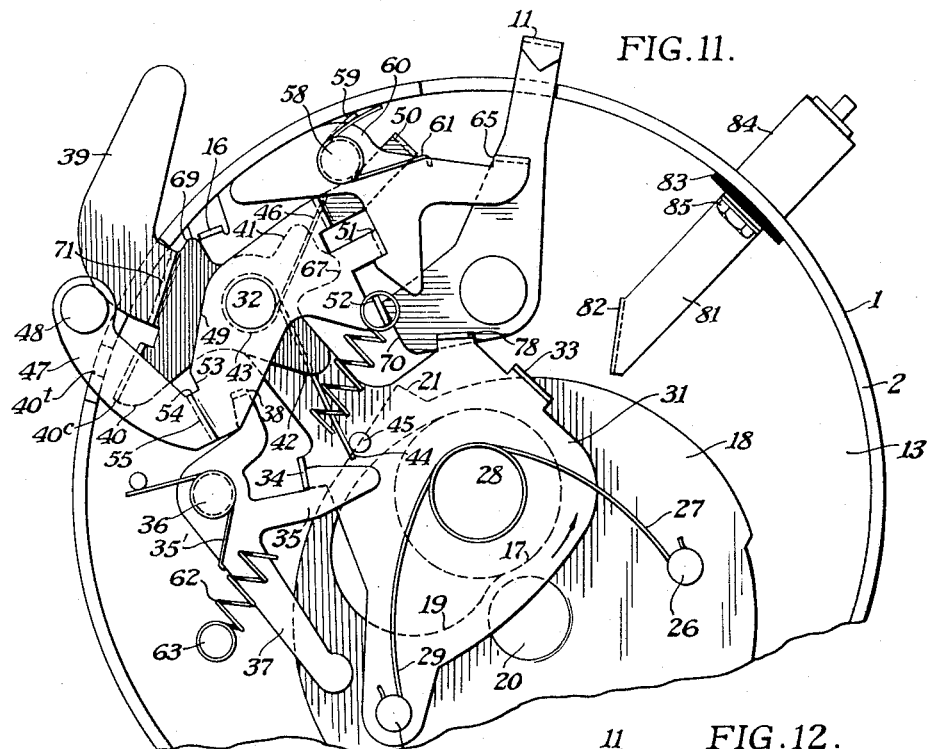
Fig. 11 is a fragmentary view generally similar to Figs. 4 and 8 except that the shutter is shown ready for an exposure after having set an operating spring, parts are omitted to better illustrate the invention.

It will be noticed from Fig. 11 that the second spring 43 is under tension and it is ready to drive the cover blind 31 as soon as the first latch element 34 and the second latch element 35 are disengaged. When this occurs, the second spring 43 moves the pin 45 and the cover blade 31 in a counterclockwise direction from the Fig. 11 position to the position shown in Fig. 12 wherein the lug 33 on the cover blind moves up against a downwardly-turned lug 65 on the upper latch element 60. This swings the third latch element 60 against the third spring 61 from the Fig. 11 to the Fig. 12 position, thereby releasing arm 51 of the shutter-setting member 47. When this latch is released, the trigger has been moved from its position of rest, Fig. 4, to its actuating position, Fig. 12, so that the lower, or fourth latch 57 will hold the setting lever 47 until the trigger 39 is permitted to move toward its rest position, Fig. 14, at which time the lower or fourth latch 57 is moved to an inoperative position releasing the lug on arm 51 and the setting lever 47 which is then moved by fourth spring 62 to its Fig. 4 position. This movement causes the cover blind 31 to move back to its Fig. 11 position so that it covers the aperture 17, tensions and releases the hairpin, or first spring 28, and returns the shutter blade 18 to its Fig. 4 position. The lug on arm 51 forming a latch element is in a releasing position whenever the trigger 39 is in its rest position since arm 41 on the trigger 39 is in engagement with the upturned flange 66, as shown in Fig. 4. However, when the trigger 39 is depressed to make an exposure, arm 41 moves away from lug 66 so that the fourth or lower latch 57 may then swing in a clockwise direction into a position to intercept the lug 51 on arm 49 of the setting lever 47 and engage it. Thus, the fourth or lower latch 57 will hold the setting lever until the trigger is in its lowermost position, at which time lug 66 is again moved by the arm 67 of the trigger so that as soon as the upper latch flange 65 is reached by flange 33 of the cover blind, the return or fourth spring 62 may restore the parts to the position shown in Fig. 4.

The fourth spring 62 is constructed and arranged to overcome the second or cover blind spring 43. This spring 43 is constructed and arranged to overcome the first or hairpin spring 28. The reason for this arrangement is that it is desirable to have an extremely light spring operate the shutter so that the first or hairpin spring 28 is a light spring which will operate the shutter blade 18 relatively slowly at the required speed. By properly selecting the strength of this spring and selecting the length of the slot 19 in the shutter blade 18, an exposure of anywhere from ⅟₂₅ to ⅟₁₀₀ of a second can readily be obtained. With modern high-speed films, and even using color film, an exposure of around a 30th to a 40th of a second is generally desirable for a single speed shutter. In order to make such an exposure efficient, we prefer to uncover the exposure aperture 17 when the cover blind is rapidly moved so that the shutter will momentarily remain in full open position before movement of the shutter blade 18 closes the aperture. However, if a higher speed exposure is wanted, as is sometimes the case, the aperture 19 can be arranged to both uncover and cover the exposure aperture 17 as is fully pointed out in Patent 2,443,164 above referred to.

It is, of course, desirable to have the second spring 43 for the cover blind sufficiently heavier, or constructed and arranged to readily operate, the first or hairpin spring 28. Here, again, this spring does not need to be an exceedingly heavy one, but merely one which will always drive the cover blind 31 so that it may in turn tension and release the first or hairpin spring 28. The return or fourth spring 62, of course, must be able to return the cover blind 31 to its initial position after an exposure has been completed. When the fourth spring 62 moves the setting lever 47 in a clockwise direction, it moves cover blind 31 from its Fig. 8 to its Fig. 4 position because of the lug on arm 50 which engages and moves lug 78 on the cover blind 31. This lug on arm 50 and the lug 78 remain in contact until the setting lever 47 is moved at which time the cover blind 31 is latched by the first latch element 34 and the second latch element 35 in a rest or aperture-covering position.

If a bulb exposure is required—that is, if an exposure of indefinite duration is required—the parts may be set to their Fig. 3 position by swinging the pointer 11 over the graduation B on scale 9 as indicating bulb exposure. This moves an abutment 70 down into the path of the stop surface 21 of the shutter blade 18, thereby preventing the blade from moving a distance sufficient to cover up the aperture 17. By depressing the trigger and swinging the cover blind out of the way, the exposure can be made and when the trigger is released the cover blind 31 will return to its aperture-covering position to complete the exposure. For instantaneous and bulb exposures, the shutter may be set or may be used as an automatic shutter.

Figure 12:
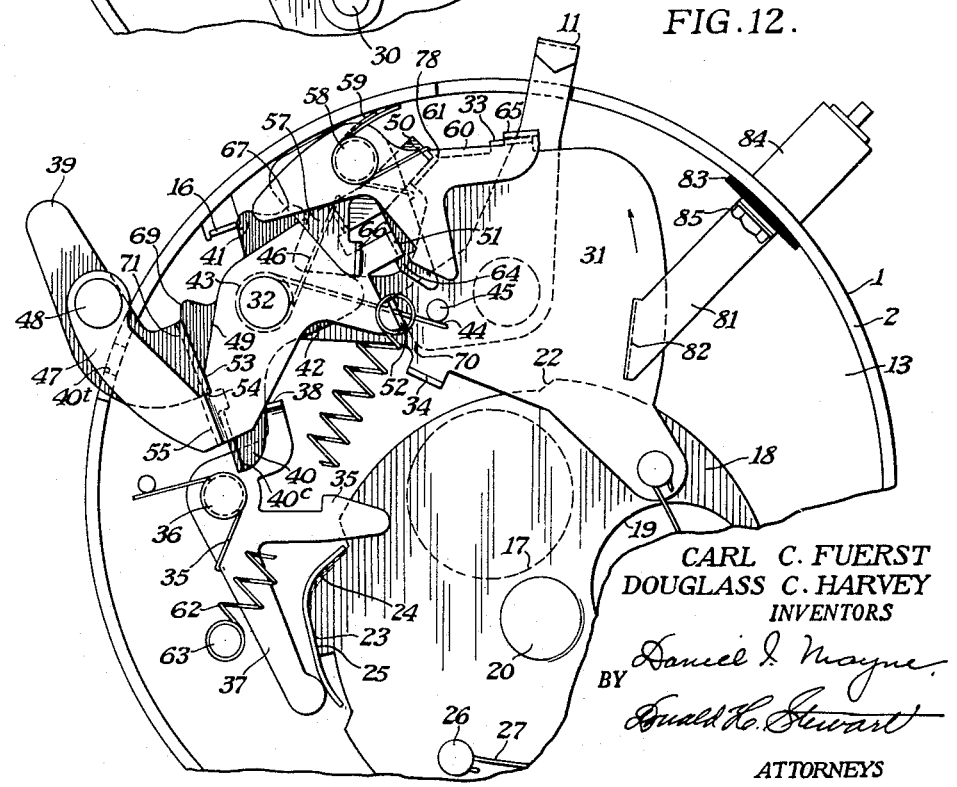
Fig. 12 is a view similar to Fig. 11 but with the parts shown in their exposure-making position.

The structures of the shutter trigger 39 and the shutter-setting lever 49, as indicated in Figs. 5 and 6, show that the setting lever has an offset 55 extending in this instance forwardly toward the front of the shutter. The trigger has an offset 71, also extending forwardly of the shutter, and includes also an arm 40 with an upwardly-extending lug 40ᶜ. Lug 40ᶜ, Fig. 2, lies beneath a threaded opening 40ᵗ for a cable release. The reason for the offsets 55 and 71 is that while the setting lever may be moved from its Fig. 4 position to its Fig. 11 position without moving the trigger, the trigger cannot be moved from its Fig. 4 position to the Fig. 12 position without carrying the setting lever with it. This occurs because the offset 71 in the trigger engages the notch 54 in the setting lever lying between the straight edge 53 and the offset 55 of the setting lever. Thus, as indicated in Fig. 12, if the shutter is being used as an automatic shutter, both the trigger 39 and the setting lever 47 move together about the stud 32 as a single part. On the other hand, if the shutter is to be used as a setting shutter, only the setting lever 47 is moved downwardly to latch the parts in the position shown in Fig. 11 ready for an exposure.

Figure 10:
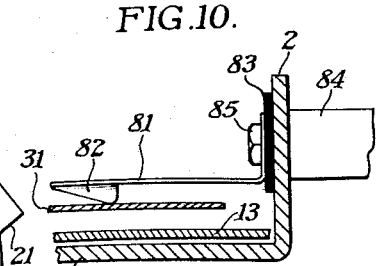
Fig. 10 is a fragmentary sectional view showing the flash contact switch in a closed position and taken on line 10—10, Fig. 8.

This shutter may readily be equipped with a flash synchronizer which, in this case, consists of a spring switch element 81 having a downwardly-turned flange 82 for engaging the cover blind 31, as shown in Fig. 10. The cover blind is grounded on the case and the switch arm 81 is mounted on an insulating plate 83. The conductor 84 may include a connector attached by a nut 85 to the arm 81 on the one side of the circuit and a connector attached to the shutter flange 2 on the opposite side of the circuit. Thus, when the cover blind swings from the Fig. 4 to the Fig. 8 position, the contact 82 will engage and slide on the cover blind 31, thus making the circuit slightly in advance of the opening of the shutter exposure aperture 17.

With the above-described embodiment of our shutter, an operator may make an exposure by merely depressing the trigger 39. In so doing flange 71 engaging slot 54 moves the setting lever 47 which turns about pivot 32 as a unit therewith setting cover blind 31 and the second spring 43, and, when the trigger lug 40 strikes lug 38, releases the second latch element 35 from 34 so that the cover blind 31 may swing open and in so doing the hairpin, the first spring 28 may be compressed and released and may drive shutter blade 18 to its Fig. 8 position to complete an exposure. Thus the shutter may be operated as a conventional "automatic" shutter. If, however, the operator particularly wishes to guard against shake handle 48 is depressed moving the setting lever 47 until lug 51 is caught by the third latch element 60 setting the return, or fourth spring 62. With the load of this movement removed from trigger 39 very light pressure will release latch 34, 35 to complete the exposure. Thus the shutter functions as a "setting" shutter.

From the above description, it will be seen that there is provided a device in which the several objects of this invention are achieved and which is well adapted to meet the conditions of practical use.

As various possible embodiments may readily be made and as various changes may be made in the embodiments above set forth, it is to be understood that all the matter herein set forth or shown in the accompanying drawings is to be interpreted as illustrative only and not in a limiting sense.

We claim:

1. A shutter of the type including a support, an exposure aperture therein, a shutter blade pivoted to the support for movement to close and open the exposure aperture, the open position being a rest position, a cover blind pivotally mounted on the support for movement to open and close the exposure aperture, the closed position being a rest position, a first latch element on the cover blind and a second latch element pivoted to the support for engaging the first latch element to hold the cover blind in an exposure aperture covering rest position, a second spring engaging the cover blind and urging it into an aperture uncovering position, a first spring connected to the shutter blade and to the cover blind, the pivotal supports for the shutter blade and cover blind being spaced apart enabling the spring engaging the cover blind to swing between the pivotal supports of the shutter blade and cover blind when the latter is moved by the second spring between its positions to open and close the exposure aperture and whereby the first spring may be tensioned and released by the cover blind movement to move the shutter blade between the aperture closed and aperture opened positions, a shutter trigger for releasing the second latch element from the first latch element to permit the cover blind and shutter blade to move and to make an exposure, a setting lever adapted to engage and move the cover blind in one direction, a fourth spring connecting the setting lever and the support normally holding said setting lever in a rest position in which the fourth spring is under a minimum tension, a third latch actuated by a third spring for holding the setting lever in a position in which the fourth spring is under its greatest tension with the setting lever lying out of engagement with the cover blind, means actuated by the trigger for releasing the third latch whereby an exposure may be made enabling the fourth spring to restore the parts to their rest positions when the trigger is released, the fourth spring being stronger than the second spring thereby returning the cover blind to its latched position and tensioning and releasing the first spring returning the shutter blade to its rest position.

2. The shutter structure as defined by claim 1 in which the trigger or the setting lever may be selectively moved by an operator and in which the trigger and the setting lever both include a handle for direct manual operation.

3. The shutter structure as defined in claim 1 characterized in that the shutter trigger and the setting lever have interengaging parts whereby the setting lever always moves when the trigger is moved and whereby the setting lever may be selectively moved while the trigger remains still.

4. The shutter structure defined in claim 1 characterized in that the trigger and setting lever are coaxially pivoted on the support and have interengaging surfaces whereby they may be moved together when the trigger is depressed and whereby the setting lever may be selectively moved independently of the trigger.

5. The shutter structure defined in claim 1 characterized in that the shutter setting lever includes a lug and the cover blind includes a lug movable through like paths, said setting lever lug engaging and moving the cover blind lug as the fourth spring restores the parts to a rest position after an exposure has been made and the trigger has been released.

6. The shutter structure defined in claim 1 in which the second spring having one end engaging the cover blind includes another end engaging the setting member whereby additional tension is placed on the second spring as the setting lever is moved to its latched set position.

7. A camera shutter of the type including a support, an exposure aperture therein, a shutter blade pivoted on the support, having a rest position exposing the aperture and movable to close the aperture, a cover blind pivoted to the support, having a rest position covering the aperture and movable to expose the aperture, a first latch element carried by the cover blind engaging and being held by a second latch element carried by the support, the pivots of the shutter blade and cover blind being spaced apart on opposite sides of the aperture, the shutter blade carrying one end of a first spring on a stud, the other end of the first spring being attached to a stud on the cover blind, the two studs being positioned and arranged to tension and release the first spring when the cover blind stud swings between the pivots of the shutter blade and cover blind thereby causing the shutter blade to swing between its rest position and its aperture closing position in making an exposure, a trigger for releasing the second latch element from the first whereby the second spring may swing the cover blind from its rest position overlying the aperture to its aperture exposing position, a third spring latch element lying in the path of a setting member, the setting member being selectively operable independently of the trigger or by the trigger into a position to be latched by the third latch, a fourth spring placed under tension when the setting lever is so latched, said spring being of greater power than the cover blind spring, the third latch being releasable by the trigger and enabling the fourth spring to move the parts to their initial position of rest, said fourth spring moving the setting lever into engagement with the cover blind to move it positively against the action of the second spring and into a position to engage the first and second latch elements.

8. The shutter structure defined in claim 7 characterized in that the trigger and setting lever are coaxially mounted and have interengaging parts positioned to move the setting lever by the trigger when the setting lever is in an unset position.

No references cited.